(12) United States Patent
Kraft

(10) Patent No.: US 10,119,472 B2
(45) Date of Patent: *Nov. 6, 2018

(54) GAS TURBINE ENERGY SUPPLEMENTING SYSTEMS AND HEATING SYSTEMS, AND METHODS OF MAKING AND USING THE SAME

(71) Applicant: POWERPHASE LLC, Jupiter, FL (US)

(72) Inventor: Robert J. Kraft, Tequesta, FL (US)

(73) Assignee: POWERPHASE LLC, Jupiter, FL (US)

( * ) Notice: Subject to any disclaimer, the term of this patent is extended or adjusted under 35 U.S.C. 154(b) by 358 days.

This patent is subject to a terminal disclaimer.

(21) Appl. No.: 14/351,245

(22) PCT Filed: Oct. 21, 2013

(86) PCT No.: PCT/US2013/065998
§ 371 (c)(1),
(2) Date: May 8, 2015

(87) PCT Pub. No.: WO2014/066276
PCT Pub. Date: May 1, 2014

(65) Prior Publication Data
US 2015/0233296 A1  Aug. 20, 2015
US 2017/0152796 A9  Jun. 1, 2017

Related U.S. Application Data

(60) Provisional application No. 61/795,836, filed on Oct. 26, 2012.

(51) Int. Cl.
*F02C 7/22*  (2006.01)
*F02C 9/50*  (2006.01)
*F02C 9/52*  (2006.01)

(52) U.S. Cl.
CPC ............. *F02C 7/22* (2013.01); *F02C 9/50* (2013.01); *F02C 9/52* (2013.01); *F05D 2270/06* (2013.01);
(Continued)

(58) Field of Classification Search
CPC ...... F02C 7/22; F02C 9/52; F02C 9/50; Y02E 20/16; F05D 2270/331; F05D 2270/06;
(Continued)

(56) References Cited

U.S. PATENT DOCUMENTS 3,163,984 A * 1/1965 Dumont ............... F01N 3/32
60/290
3,359,723 A  12/1967 Bohensky et al.
(Continued)

FOREIGN PATENT DOCUMENTS

CN  1959085  5/2007
CN  101225769 A  7/2008
(Continued)

OTHER PUBLICATIONS

Notice of Preliminary Rejection dated Aug. 31, 2016, corresponding to Korean Patent Application No. 10-2015-7001459, with English translation (8 pages).
(Continued)

*Primary Examiner* — Jason Newton
(74) *Attorney, Agent, or Firm* — Lathrop Gage LLP

(57) ABSTRACT

Electrical power systems, including generating capacity of a gas turbine, where additional electrical power is generated utilizing a separately fueled system during periods of peak electrical power demand.

11 Claims, 12 Drawing Sheets

(52) U.S. Cl.
CPC .. *F05D 2270/071* (2013.01); *F05D 2270/082* (2013.01); *F05D 2270/331* (2013.01); *Y02E 20/16* (2013.01)

(58) Field of Classification Search
CPC ......... F05D 2270/082; F05D 2270/071; Y02T 10/6295; Y02T 10/16; B60Y 2400/431
USPC ............................................ 290/1 R; 60/776
See application file for complete search history.

(56) References Cited

U.S. PATENT DOCUMENTS

| | | | | |
|---|---|---|---|---|
| 3,513,929 | A * | 5/1970 | Kim ...................... | F02B 37/166 123/1 A |
| 3,831,373 | A * | 8/1974 | Flynt ...................... | F02C 6/16 290/52 |
| 3,990,242 | A * | 11/1976 | Muller .................... | F02B 41/10 60/280 |
| 4,133,171 | A | 1/1979 | Earnest et al. | |
| 4,175,384 | A | 11/1979 | Wagenknecht et al. | |
| 5,724,806 | A * | 3/1998 | Horner ...................... | F02C 7/12 60/728 |
| 5,778,675 | A * | 7/1998 | Nakhamkin ............... | F02C 6/16 60/39.17 |
| 5,845,481 | A | 12/1998 | Briesch et al. | |
| 5,934,063 | A * | 8/1999 | Nakhamkin ............... | F02C 6/06 60/727 |
| 6,038,849 | A * | 3/2000 | Nakhamkin ............... | F02C 6/06 60/726 |
| 6,212,871 | B1 | 4/2001 | Rakhmailov | |
| 6,305,158 | B1 | 10/2001 | Nakhamkin et al. | |
| 6,389,793 | B1 * | 5/2002 | Priestley ................. | F01D 25/12 60/782 |
| 6,422,807 | B1 * | 7/2002 | Leach ...................... | F01D 11/24 415/1 |
| 6,481,212 | B2 | 11/2002 | Priestley | |
| 6,499,303 | B1 | 12/2002 | Polukort et al. | |
| 6,526,758 | B2 * | 3/2003 | Ranasinghe .......... | F01K 21/047 60/39.55 |
| 6,769,259 | B2 * | 8/2004 | Yamanaka ................ | F02C 3/10 60/778 |
| 7,389,644 | B1 * | 6/2008 | Nakhamkin ............... | F02C 6/16 60/39.183 |
| 7,406,828 | B1 * | 8/2008 | Nakhamkin ............... | F02C 6/16 60/39.183 |
| 8,141,360 | B1 * | 3/2012 | Huber ...................... | B60K 6/24 290/40 B |
| 8,616,005 | B1 | 12/2013 | Cousino | |
| 8,875,483 | B2 * | 11/2014 | Wettstein .................. | F02C 3/34 60/39.5 |
| 9,695,749 | B2 * | 7/2017 | Kraft ........................ | F02C 7/08 |
| 9,777,630 | B2 * | 10/2017 | Kraft ........................ | F02C 6/16 |
| 9,803,548 | B2 * | 10/2017 | Kraft ........................ | F02C 7/10 |
| 2001/0000091 | A1 | 4/2001 | Nakhamkin et al. | |
| 2003/0131585 | A1 | 7/2003 | Saito et al. | |
| 2004/0020209 | A1 * | 2/2004 | Nakae ...................... | F23R 3/06 60/723 |
| 2005/0000227 | A1 * | 1/2005 | McCaffrey ............. | F23R 3/343 60/796 |
| 2005/0087330 | A1 | 4/2005 | Kang et al. | |
| 2006/0213183 | A1 | 9/2006 | Althaus | |
| 2007/0006592 | A1 * | 1/2007 | Balan ...................... | F02C 3/22 60/772 |
| 2009/0196736 | A1 * | 8/2009 | Sengar .................... | F01D 11/04 415/115 |
| 2009/0200805 | A1 | 8/2009 | Kim et al. | |
| 2011/0005228 | A1 | 1/2011 | Yoshinari et al. | |
| 2011/0181050 | A1 * | 7/2011 | Dinu ........................ | F02C 3/13 290/1 R |
| 2011/0203290 | A1 | 8/2011 | Kagimoto et al. | |
| 2011/0289930 | A1 | 12/2011 | Draper | |
| 2012/0255311 | A1 * | 10/2012 | Miyake ................... | F23R 3/005 60/806 |
| 2014/0250902 | A1 * | 9/2014 | Kraft ........................ | F02C 6/16 60/773 |
| 2014/0321967 | A1 | 10/2014 | Zhang et al. | |
| 2014/0366547 | A1 * | 12/2014 | Kraft ....................... | F02C 7/224 60/772 |
| 2015/0233296 | A1 * | 8/2015 | Kraft ........................ | F02C 9/50 60/776 |
| 2015/0240713 | A1 * | 8/2015 | Kraft ........................ | F02C 3/10 60/774 |
| 2015/0240719 | A1 * | 8/2015 | Kraft ........................ | F02C 6/00 290/52 |
| 2016/0130982 | A1 * | 5/2016 | Kraft .................... | F01K 23/101 60/775 |
| 2017/0370289 | A1 * | 12/2017 | Kraft ........................ | F02C 7/10 |

FOREIGN PATENT DOCUMENTS

| | | |
|---|---|---|
| EP | 1512855 A1 | 3/2005 |
| GB | 776269 | 6/1957 |
| JP | H02-78736 A | 3/1990 |
| JP | H09-25830 A | 1/1997 |
| JP | H11-270352 A | 10/1999 |
| JP | 2002519580 A | 7/2002 |
| JP | 2009047170 A | 3/2009 |
| JP | 2009215962 A | 9/2009 |
| JP | 2011247266 A | 12/2011 |
| SU | 289209 A1 | 11/1970 |
| WO | WO 00/01934 A | 1/2000 |
| WO | WO2010073951 A1 | 6/2012 |
| WO | WO2013116185 A1 | 8/2013 |

OTHER PUBLICATIONS

Notice of Final Rejection dated Feb. 16, 2017, for Korean Patent Application No. 10-2015-7001459 (including English translation).
Second Office Action dated Dec. 2, 2016, for Chinese Patent Application No. 201380055834.6 (including English translation).
Japanese Office Action dated Oct. 26, 2016, for Japanese Patent Application No. 2015-539696 (including English translation).
International Search Report and Written Opinion dated May 19, 2014, corresponding to International Application No. PCT/US2013/065998.
Chinese Application No. 201380055834.6, dated Mar. 2, 2016.
Office Action dated Jun. 13, 2017, for Omani Patent Application No. OM/P/2015/00105, including English summary.
Rejection Decision dated Jun. 15, 2017, for Chinese Patent Application No. 201380055834.6, including English translation.
First Office Action dated Jul. 5, 2017, for Chilean Patent Application No. 01067-2015, including partial English translation.
Office Action dated Jun. 30, 2017, for Japanese Patent Application. No. 2015-539696, including English translation.

* cited by examiner

GAS TURBINE ENERGY SUPPLEMENTING SYSTEMS AND HEATING SYSTEMS, AND METHODS OF MAKING AND USING THE SAME

FIELD OF THE INVENTION

The invention relates generally to electrical power systems, including generating capacity of a gas turbine, and more specifically to energy storage that is useful for providing additional electrical power during periods of peak electrical power demand and providing systems that keep the gas turbine and steam turbine hot and ready to run thus reducing start up time.

BACKGROUND OF THE INVENTION

Currently marginal energy is produced mainly by gas turbine, either in simple cycle or combined cycle configurations. As a result of load demand profile, the gas turbine base systems are cycled up during periods of high demand and cycled down or turned off during periods of low demand. This cycling is typically driven by the Grid operator under a program called active grid control, or AGC. Unfortunately, because industrial gas turbines, which represent the majority of installed base, were designed primarily for base load operation, when they are cycled, a severe penalty is associated with the maintenance cost of that particular unit. For example, a gas turbine that is running base load could go through a normal maintenance once every three years, or 24,000 hours at a cost in the 2-3 million dollar range. That same cost could be incurred in one year for a plant that is forced to start up and shut down every day.

Currently these gas turbine plants can turn down to approximately 50% of their rated capacity. They do this by closing the inlet guide vanes of the compressor, which reduces the air flow to the gas turbine, also driving down fuel flow as a constant fuel air ratio is desired in the combustion process. Maintaining safe compressor operation and emissions typically limit the level of turn down that can be practically achieved. The safe compressor lower operating limit is improved in current gas turbines by introducing warm air to the inlet of the gas turbine, typically from a mid stage bleed extraction from the compressor. Sometimes, this warm air is also introduced into the inlet to prevent icing. In either case, when this is done, the work that is done to the air by the compressor is sacrificed in the process for the benefit of being able to operate the compressor safely to a lower flow, thus increasing the turn down capability. This has a further negative impact on the efficiency of the system as the work performed on the air that is bled off is lost. Additionally, the combustion system also presents a limit to the system.

The combustion system usually limits the amount that the system can be turned down because as less fuel is added, the flame temperature reduces, increasing the amount of CO emissions that is produced. The relationship between flame temperature and CO emissions is exponential with reducing temperature, consequently, as the gas turbine system gets near the limit, the CO emissions spike up, so a healthy margin is kept from this limit. This characteristic limits all gas turbine systems to approximately 50% turn down capability, or, for a 100 MW gas turbine, the minimum power that can be achieved is about 50%, or 50 MW. As the gas turbine mass flow is turned down, the compressor and turbine efficiency falls off as well, causing an increase in heat rate of the machine. Some operators are faced with this situation every day and as a result, as the load demand falls, gas turbine plants hit their lower operating limit and have to turn the machines off which cost them a tremendous maintenance cost penalty.

Another characteristic of a typical gas turbine is that as the ambient temperature increases, the power output goes down proportionately due to the linear effect of the reduced density as the temperature of air increases. Power output can be down by more than 10% from nameplate during hot days, typically when peaking gas turbines are called on most to deliver power.

Another characteristic of typical gas turbines is that air that is compressed and heated in the compressor section of the gas turbine is ducted to different portions of the gas turbine's turbine section where it is used to cool various components. This air is typically called turbine cooling and leakage air (hereinafter "TCLA") a term that is well known in the art with respect to gas turbines. Although heated from the compression process, TCLA air is still significantly cooler than the turbine temperatures, and thus is effective in cooling those components in the turbine downstream of the compressor. Typically 10% to 15% of the air that comes in the inlet of the compressor bypasses the combustor and is used for this process. Thus, TCLA is a significant penalty to the performance of the gas turbine system.

Another characteristic of gas turbines is they typically take 20-30 minutes to start up due to thermal loading considerations and the heat recovery steam generator (HRSG) at combined cycle plant can take an hour or more. This is a significant because the combined cycle plants are being used more frequently to balance renewable energy intermittency which fluctuates significantly in minutes.

SUMMARY OF THE INVENTION

The current invention provides several options, depending on specific plant needs, to improve the upper limit of the power output of the gas turbine, thus increasing the capacity and regulation capability of a new or existing gas turbine system.

One aspect of the present invention relates to methods and systems that allow gas turbine systems to more efficiently provide the maximum additional power during periods of peak demand because a separately fueled engine is used to drive the system, which eliminates significant parasitic loads typically associated with compressed air injection systems.

Another aspect of the present invention relates to an exhaust recirculation system that eliminates the point source of emissions from the separately fueled engine.

Another aspect of the present invention relates to efficiency improvements utilizing the waste heat associated with the exhaust gas recirculation system.

Another aspect of the present invention relates to a fueled inlet chiller system where the waste heat from the separately fueled engine increases the power output of the steam turbine thus maintaining or improving efficiency of a combined cycle plant.

Another aspect of the present invention relates to an alternate use of a power boost system while the power plant is not running where compressed air is forced through the gas turbine and exhaust from the separately fueled engine is forced through the heat recovery steam generator ("HRSG") to keep the entire gas turbine and steam turbine hot which reduces start up time.

Another aspect of the present invention relates to an alternate use of the power boost system while the power plant is not running where compressed air is forced through the gas turbine and the HRSG to keep the entire gas turbine and steam turbine hot which reduces start up time.

Another aspect of the present invention relates to a power boost air injection system that displaces cooling air normally taken from the mid-stage or compressor discharge plenum of the gas turbine while at the same time the exhaust from the separately fueled engine is used in the HRSG to produce additional power. The alternately supplied cooling air may be similar in temperature and pressure to the air it is displacing, or cooler (which results in a reduction in cooling air requirements and improved gas turbine ("GT") efficiency).

Another aspect of the present invention relates to the use of relatively cool first stage nozzle cooling air leading to a reduction in cooling air requirements which translates to improved efficiency.

Another aspect of the present invention relates to a power boost system delivering relatively cool cooling air and during periods when the combined cycle plant is not running, delivering hot compressed air to keep the turbine section hot while at the same time using the separately fueled engine's exhaust in a packaged boiler to run steam through the HRSG and steam turbine to minimize the start up time of the complete combined cycle ("CC") plant.

Another aspect of the present invention relates to utilizing a separately fueled engine to drive hot compressed air into the combustion discharge plenum while at the same time utilizing the excess lower quality (i.e. lower temperature) heat available from the separately fueled engine's exhaust to preheat the GT's fuel, thus improving efficiency of the GT.

One embodiment of the invention relates to a system comprising a supplemental compressor, at least one compressor, at least one electrical generator, at least one turbine (the at least one turbine connected to the at least one generator and the at least one compressor), and a combustion case (which is the discharge manifold for the compressor).

Another advantage of another preferred embodiment is the ability to increase the power output of the gas turbine system quickly with supplemental compressed hot air being delivered by the separately fueled engine.

Another advantage of the preferred embodiment is the recirculation of some or all of the exhaust gas from the separately fueled engine thus minimizing or eliminating the emissions from a second source of emissions at the power plant.

Another advantage of the preferred embodiment is the recirculation of some or all of the exhaust gas from the separately fueled engine thus minimizing or eliminating the cost associated with emissions clean up by using the existing GT's emission control system.

An advantage of other preferred embodiments is the ability to increase the power output while at the same time improving efficiency of the overall system.

Another advantage of embodiments of the present invention is the ability to improve the power output and efficiency of a conventional chiller system.

Another advantage of embodiments of the present invention is the ability to keep the gas turbine and steam turbine components warm while the plant is turned off thus reducing the start up time required.

Another advantage of some embodiments of the present invention is the ability to improve the efficiency of the integrated power boost system by reducing the heat that is otherwise wasted associated with cooled cooling air circuits of the GT.

Another advantage of some embodiments of the present invention is the ability to deliver cooler cooling air to externally supplied turbine components resulting in a reduction in the TCLA required for the GT and an improvement in the efficiency of the integrated power boost system.

Another advantage of some embodiments of the present invention is the ability to deliver cooler cooling air to internally supplied turbine components by preferential discharge or direct manifolding of the cooling air resulting in a reduction in the TCLA required for the GT and an improvement in the efficiency of the integrated power boost system.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

DETAILED DESCRIPTION OF THE INVENTION

Figure 1:
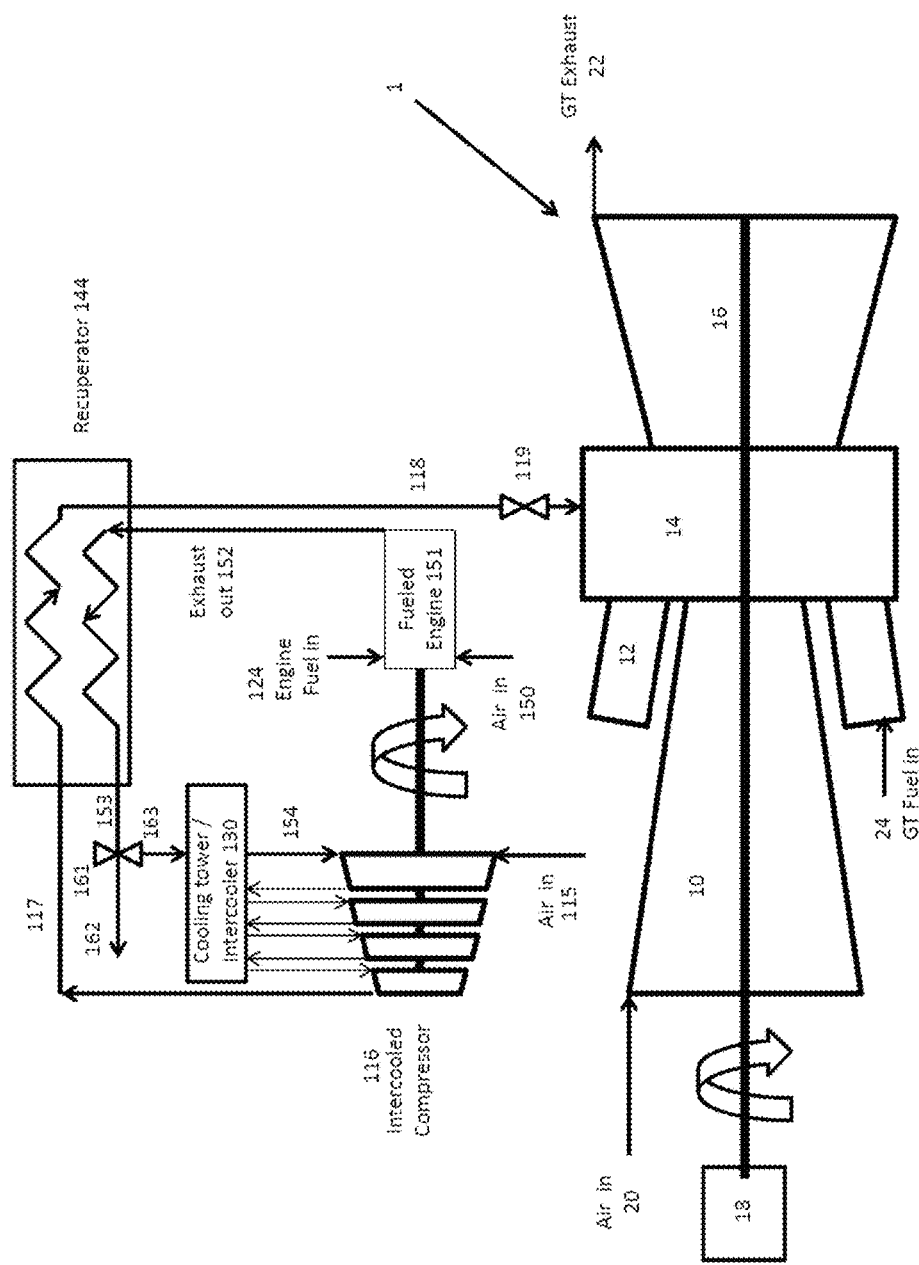
FIG. 1 is a schematic drawing of an embodiment of the present invention having a supplemental energy system with a recuperated fueled engine, with exhaust gas recirculation, driving the supplemental compressor where some or all of the recuperated engine's exhaust is delivered to the GT for further combustion.

One aspect of the invention relates to methods and systems that allow gas turbine systems to run more efficiently under various conditions or modes of operation. In systems such as the one discussed in U.S. Pat. No. 6,305,158 to Nakhamkin (the "'158 patent"), there are three basic modes of operation defined, a normal mode, charging mode, and an air injection mode, but it is limited by the need for an electrical generator that has the capacity to deliver power "exceeding the full rated power" that the gas turbine system can deliver. The fact that this patent has been issued for more than 10 years and yet there are no known applications of it at a time of rapidly rising energy costs is proof that it does not address the market requirements.

First of all, it is very expensive to replace and upgrade the electrical generator so it can deliver power "exceeding the full rated power" that the gas turbine system can currently deliver.

Another drawback is that the system cannot be implemented on a combined cycle plant without a significant negative impact on fuel consumption. Most of the implementations outlined use a recuperator to heat the air in simple cycle operation, which mitigates the fuel consumption increase issue, however, it adds significant cost and complexity. The proposed invention outlined below addresses both the cost and performance shortfalls of the systems disclosed in the '158 patent.

One embodiment of the invention relates to a method of operating a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine, operation of which is which is independent of the electric grid; and (c) injecting the pressurized air into the combustor case.

According to one preferred embodiment, the warm exhaust from the separately fueled engine is used to preheat fuel that is fed into the combustor. Preferably, the fueled engine includes a jacket cooling system, and heat removed from the jacket cooling system is used to preheat fuel that is fed into the combustor.

According to another preferred embodiment, all or a portion of the fueled engine's exhaust is diverted to provide heat input to a heat recovery steam generator when the gas turbine is not operating.

According to another preferred embodiment, the pressurized air produced by the fueled engine driven compression process is diverted to provide heat input to a heat recovery steam generator and/or the turbine when the gas turbine is not operating.

Another embodiment of the invention relates to a method of operating a gas turbine energy system comprising:

(a) operating a gas turbine system comprising a compressor, a combustor case, a combustor, and a turbine, fluidly connected to each other;

(b) pressurizing ambient air and a portion of the exhaust gases from a fueled engine, using a supplemental compressor driven by the fueled engine; and (c) injecting the pressurized air and exhaust mixture into the combustor case, wherein operation of the fueled engine is independent of the electric grid.

According to one preferred embodiment, warm exhaust from the separately fueled engine is used to preheat fuel that is fed into the combustor. Preferably, the fueled engine includes a jacket cooling system, and heat removed from the jacket cooling system is used to preheat fuel that is fed into the combustor.

According to another preferred embodiment, all or a portion of the fueled engine's exhaust is diverted to provide heat input to a heat recovery steam generator and/or the turbine when the gas turbine is not operating.

According to another preferred embodiment, the pressurized air produced by the fueled engine driven compression process is diverted to provide heat input to a heat recovery steam generator and/or the turbine when the gas turbine is not operating.

Yet another embodiment of the invention relates to a method of operating a gas turbine energy system comprising:

(a) operating a gas turbine system comprising a compressor, a combustor case, a combustor, and a turbine, fluidly connected to each other;

(b) pressurizing ambient air and all of the exhaust gases from a fueled engine, using a supplemental compressor driven by the fueled engine; and (c) injecting the pressurized air and exhaust mixture into the combustor case, wherein operation of the fueled engine is independent of the electric grid.

According to one preferred embodiment, warm exhaust from the separately fueled engine is used to preheat fuel that is fed into the combustor. Preferably, the fueled engine includes a jacket cooling system, and heat removed from the jacket cooling system is used to preheat fuel that is fed into the combustor.

According to another preferred embodiment, all or a portion of the fueled engine's exhaust is diverted to provide heat input to a heat recovery steam generator and/or the turbine when the gas turbine is not operating.

According to another preferred embodiment, the pressurized air produced by the fueled engine driven compression process is diverted to provide heat input to a heat recovery steam generator and/or the turbine when the gas turbine is not operating.

Yet another embodiment of the invention relates to a method of operating a gas turbine energy system comprising:

(a) operating a gas turbine system comprising a compressor, a combustor case, a combustor, and a turbine, fluidly connected to each other;

(b) pressurizing only the exhaust gasses from a fueled engine, using a supplemental compressor driven by the fueled engine; and (c) injecting the pressurized air and exhaust mixture into the combustor case, wherein operation of the fueled engine is independent of the electric grid.

According to one preferred embodiment, warm exhaust from the separately fueled engine is used to preheat fuel that is fed into the combustor. Preferably, the fueled engine includes a jacket cooling system, and heat removed from the jacket cooling system is used to preheat fuel that is fed into the combustor.

According to another preferred embodiment, all or a portion of the fueled engine's exhaust is diverted to provide heat input to a heat recovery steam generator and/or the turbine when the gas turbine is not operating.

According to another preferred embodiment, the pressurized air produced by the fueled engine driven compression process is diverted to provide heat input to a heat recovery steam generator and/or the turbine when the gas turbine is not operating.

Yet another embodiment relates to a method of operating a gas turbine energy system comprising:

(a) operating a gas turbine system comprising a compressor, a combustor case, a combustor, and a turbine, fluidly connected to each other;

(b) cooling gas turbine inlet air using a supplemental refrigeration process driven by a fueled engine; and (c) injecting exhaust from separately fueled engine into the exhaust of the gas turbine, wherein operation of the fueled engine is independent of the electric grid.

Yet another embodiment relates to a method of operating a gas turbine energy system comprising:

(a) operating a gas turbine system comprising a compressor, a combustor case, a combustor, and a turbine, fluidly connected to each other;

(b) cooling gas turbine inlet air using a supplemental refrigeration process driven by a fueled engine; and (c) injecting exhaust from separately fueled engine into the exhaust of the gas turbine, wherein operation of the fueled engine is independent of the electric grid.

Yet another embodiment relates to a method of operating a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine; and (c) injecting the pressurized air into a rotor cooling air circuit upstream of a rotor air cooler, wherein operation of the fueled engine is independent of the electric grid.

Preferably, the exhaust from the alternately fueled engine is discharged into exhaust of the turbine.

Yet another embodiment relates to a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine; and (c) injecting the pressurized air into a rotor cooling air circuit downstream of a rotor air cooler, wherein operation of the fueled engine is independent of the electric grid.

Preferably, the exhaust from the alternately fueled engine is discharged into exhaust of the turbine.

Another embodiment relates to a method of operating a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine;

(c) injecting the pressurized air into the intermediate pressure cooling circuit, wherein operation of the fueled engine is independent of the electric grid.

Preferably, the exhaust from the alternately fueled engine is discharged into exhaust of the turbine.

Another embodiment relates to a method of operating a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine; and, (c) injecting the pressurized air into the first stage nozzle cooling circuit, wherein operation of the fueled engine is independent of the electric grid.

Preferably, the exhaust from the alternately fueled engine is discharged into exhaust of the turbine.

Another embodiment relates to a method of operating a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine;

(c) injecting the pressurized air into a gas turbine cooling circuit; and (d) injecting steam that is produced utilizing the heat from alternately fueled engine into the turbine, wherein operation of the fueled engine is independent of the electric grid.

Another embodiment relates to a method of operating a gas turbine energy system comprising:

(a) operating a gas turbine system comprising a compressor, a combustor case, a combustor, and a turbine, fluidly connected to each other;

(b) pressurizing ambient air using a supplemental compressor driven by a fueled engine;

(c) injecting the pressurized air into the turbine when the gas turbine system in not running, wherein operation of the fueled engine is independent of the electric grid Another embodiment relates to a method of operating a gas turbine energy system comprising:

(a) operating a gas turbine system comprising a compressor, a combustor case, a combustor, and a turbine, fluidly connected to each other; and (b) injecting steam, that is produced utilizing the heat from an alternately fueled engine, into a heat recovery steam generator while the gas turbine system is not running.

Another embodiment relates to a method of operating a gas turbine energy system comprising:

(a) operating a gas turbine system comprising a compressor, a combustor case, a combustor, and a turbine, fluidly connected to each other; and (b) injecting the exhaust of a separately fueled engine into a heat recovery steam generator while the gas turbine system is not running.

Yet another embodiment of the invention relates to an apparatus configured to perform the methods according to the invention including a gas turbine system comprising a compressor, a combustor case, a combustor, and a turbine, fluidly connected to each other and one or more additional components (e.g., a fueled engine) configured to perform a method according to the invention.

The components of one embodiment of the present invention are shown in FIG. 1 as they are used with an existing gas turbine system (1). The gas turbine system (1) includes a compressor (10), combustor (12), combustion case (14), turbine (16) and generator (18). A fueled engine (151), which is either a reciprocating internal combustion engine, a gas turbine, or a similar machine that converts fuel into energy through an exothermic reaction such as combustion, is used to drive a multistage intercooled supplemental compressor (116) which compresses ambient air (115) and/or cooled exhaust (154) and discharges compressed air/exhaust (117). As those skilled in the art will readily appreciate, as air/exhaust in the supplemental compressor passes from one compressor stage to the next, the air is intercooled by use of a heat exchanger, such as a cooling tower, to reduce the work required to compress the air at the subsequent compressor stage. Doing so increases the efficiency of the supplemental compressor (116), which makes it more efficient than the compressor (10) of the gas turbine system (1).

This embodiment further includes a recuperator (144), which is a heat exchanger that receives the exhaust gas (152) from the fueled engine (151) and the compressed air/exhaust (117) from the supplemental compressor (116). Within the recuperator (144), the hot exhaust gas (152) heats the compressed air/exhaust (117) and then exits the recuperator (144) as substantially cooler exhaust gas (153). At the same time in the recuperator (144), the compressed air/exhaust (117) absorbs heat from the exhaust gas (152) and then exits the recuperator (144) as substantially hotter compressed air/exhaust (118) than when it entered the recuperator (144). The substantially hotter compressed air/exhaust (118) is then discharged into the combustion case (14) of the gas turbine system (1) where it becomes an addition to the mass flow through the combustor (12) and turbine (16).

The warm exhaust gas (153) discharged from the recuperator (144) enters valve (161) which directs some or all of the warm exhaust gas (153) to the cooling tower (130) for further cooling. The cool exhaust gas (154) enters the inlet of the supplemental compressor (116). Additional ambient air (115) may also be added to the inlet of the supplemental compressor (116). Any of the warm exhaust gas (153) that is not diverted to the cooling tower (130) by valve (161) can be discharged to atmosphere, to a fuel heating system, or to the GT exhaust (22).

The partial exhaust recirculation system of the present invention reduces the emissions from the separately fueled engine while the 100% exhaust recirculation system eliminates the separately fueled engine as source of emissions. This can be very helpful for permitting reasons as well as reducing cost as the existing gas turbine's exhaust clean up system can be used thus eliminating potential cost to the project.

Figure 11:
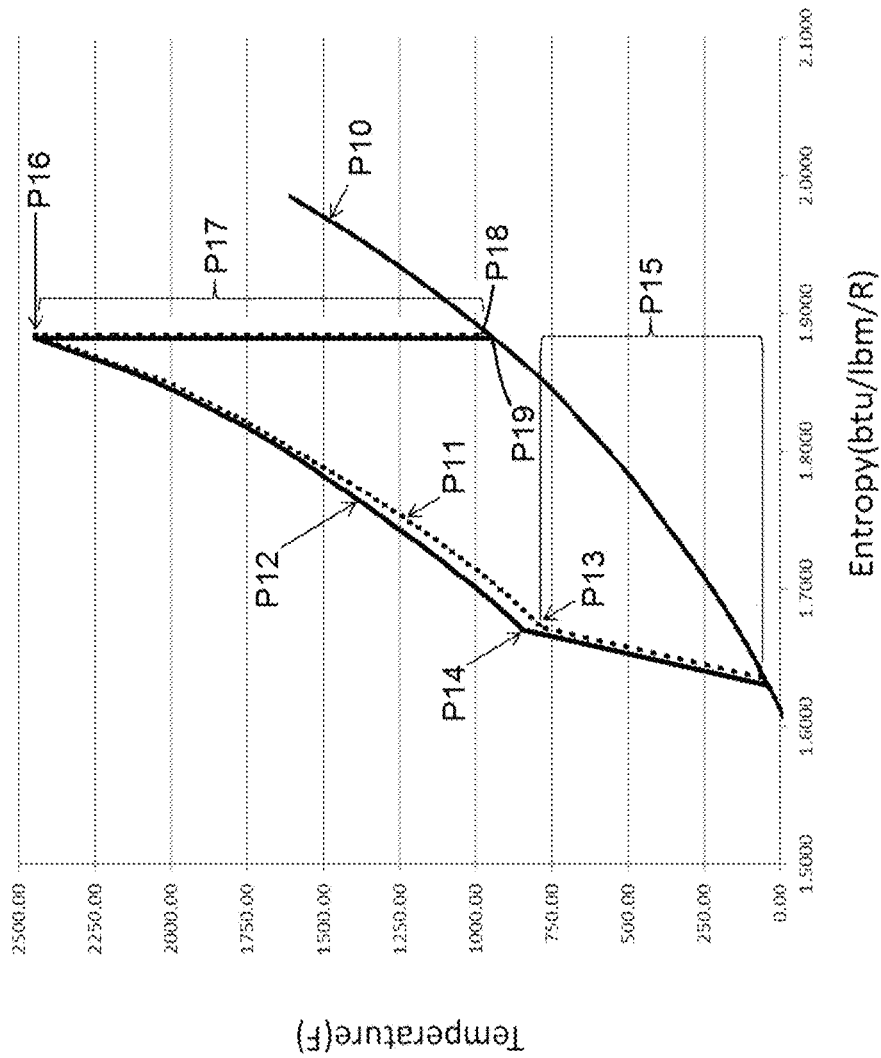
FIG. 11 shows a gas turbine cycle of the type applicable to the present invention on a temperature-entropy of enthalpy-entropy diagram for SW501FD2 with 55 lbs/sec injection (+5.5%).

It turns out that gasoline, diesel, natural gas, or biofuel and similar reciprocating engines are relatively insensitive to back pressure so putting the recuperator (144), on the fueled engine (151) does not cause a significantly measurable effect on the performance of the fueled engine (151). FIG. 11 shows the gas turbine cycle on a TS or HS (temperature-entropy of Enthalpy-Entropy) diagram. Since temperature and enthalpy are proportional to each other (Cp), the vertical distance between the 14.7 psi ambient pressure (P10) and the compressor discharge pressure ("CDP") process represents the compressor work required to pump the air up to CDP. The dotted line (P11) shows the compressor discharge pressure without injection, which is 218.1 psi, while the dashed line (P12) shows the compressor discharge pressure with injection, which is 230.5 psi. The compressor discharge temperature increases from 770 F (P13) without compressed air injection, to 794 F (P14) with compressed air injection due to increased compression pressure ratio. This additional 24 F results in 1% less fuel required to heat air to the 2454 F firing temperature, and also results in +1.3% increase in compressor work (as compared to the compressor work (P15) without compressed air injection), or 3.5 MW. The temperature rise (and corresponding enthalpy rise) from approximately 750 F up to the turbine inlet temperature ("TIT") of approximately 2454 F, the "firing temperature" (P16), which represents the fuel input in British Thermal Units ("BTU"). The vertical distance from CDP (P11, P12) to 14.7 psi (P10) on the right hand side represents the turbine work (P17), which is approximately two times the compressor work (P15). The exhaust temperature drops with injection, due to higher expander pressure ratio, from 987 F (P18) to 967 F (P19), a decrease of 20 F, or +0.81% more power per lb of air, or +4.7 MW at base flow.

Figure 12:
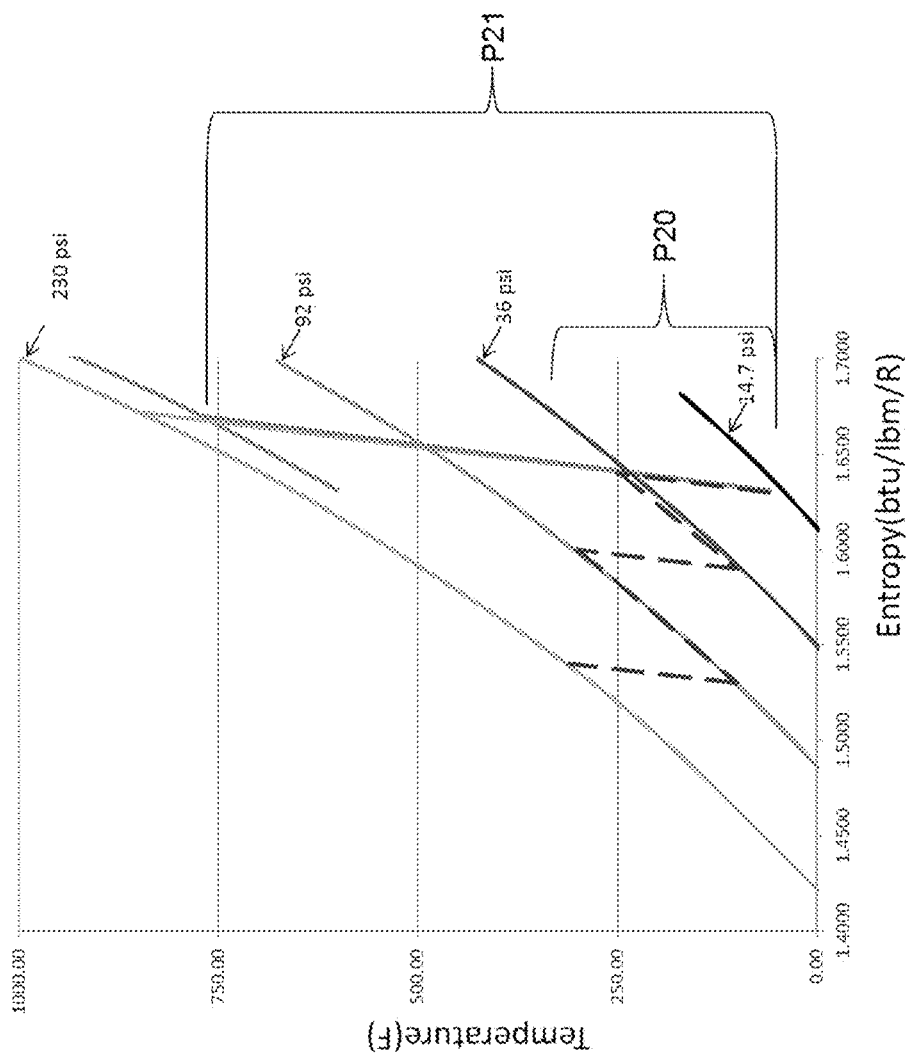
FIG. 12 shows a comparison of the work per pound mass required to pump air from atmospheric conditions to elevated pressure for SW501FD2 compressor compared to an intercooled compressor process.

FIG. 12 shows a comparison of the work per pound mass required to pump air from atmospheric conditions (14.7 psi) to a pressure slightly higher than CDP (230 psi) so that it can be discharged in the CDP plenum. As you can see, the dashed curve represents a 3 stage intercooled compressor with approximately 2.45 pressure ratio per stage (36 psi after the first stage and 92 psi after the $2^{nd}$ stage, 230 psi after the $3^{rd}$ stage). The work to compress 1 lbm of air using an intercooled process (P20) is significantly less than a non-intercooled compressor even considering similar stage compression efficiency. Realistically, because of intercooler pressure losses at each stage and the fact air actually has to be pumped up to a higher pressure than CDP to effectively inject the air into the GT, more work is required than FIG. 12 implies. However, on a per pound basis even considering these considerations, the intercooled compressor uses less power than the work (P21) required by the GT to compress air for the turbine cycle.

Figure 2:
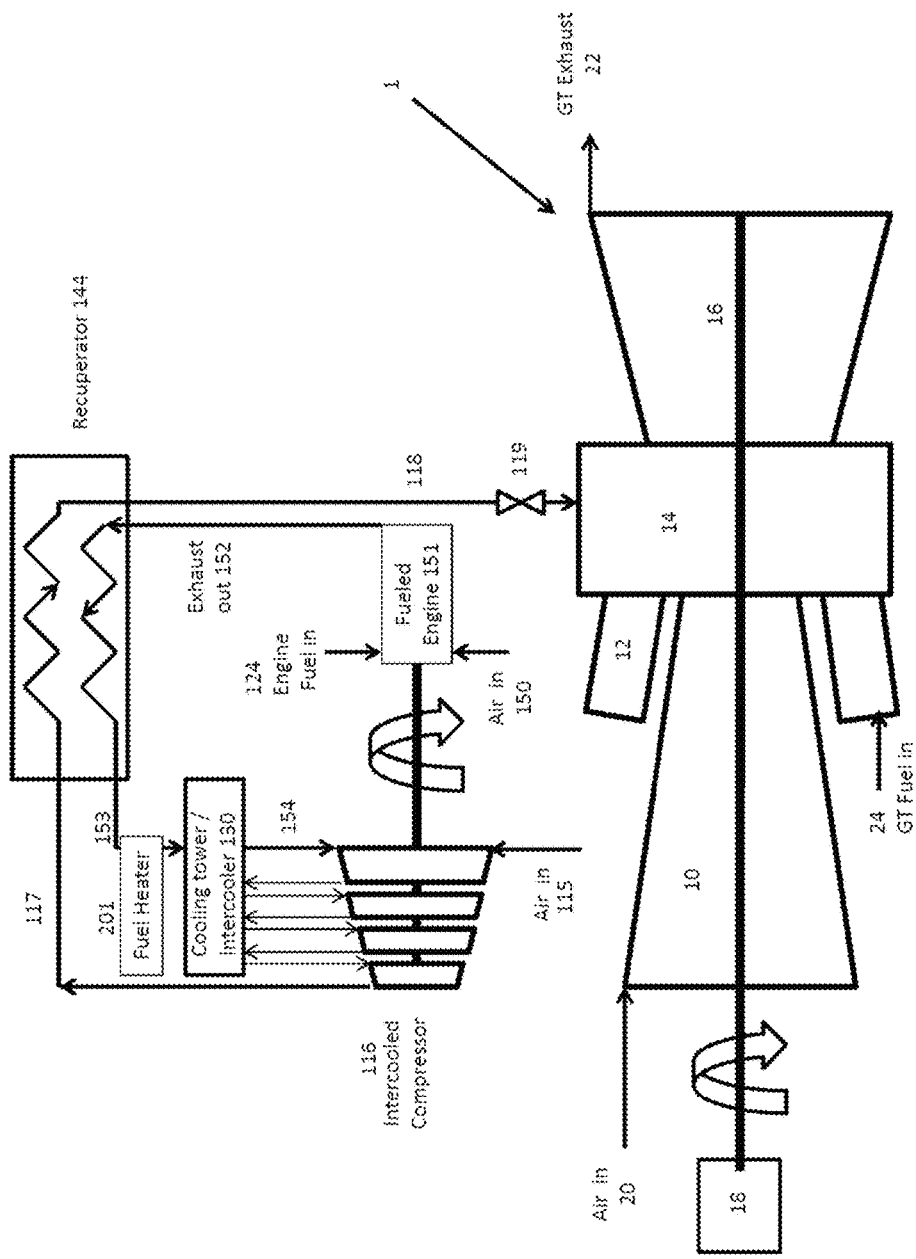
FIG. 2 is a schematic drawing of an embodiment of the present invention having a supplemental energy system with a recuperated fueled engine, with exhaust gas recirculation and fuel heating, driving the supplemental compressor where some or all of the recuperated engine's exhaust is delivered to the GT for further combustion and the low quality waste heat is further used to heat the GT fuel.

FIG. 2 shows the embodiment of FIG. 1 where fuel heating is accomplished by using the warm exhaust (153) to heat the fuel in a fuel heater (201). This further improves the efficiency of the power plant as fuel heating reduces the BTU fuel input required to raise the compressor (10) discharge air up to the turbine inlet temperature which results in a reduced quantity of fuel (24) that is required by the GT.

Figure 3:
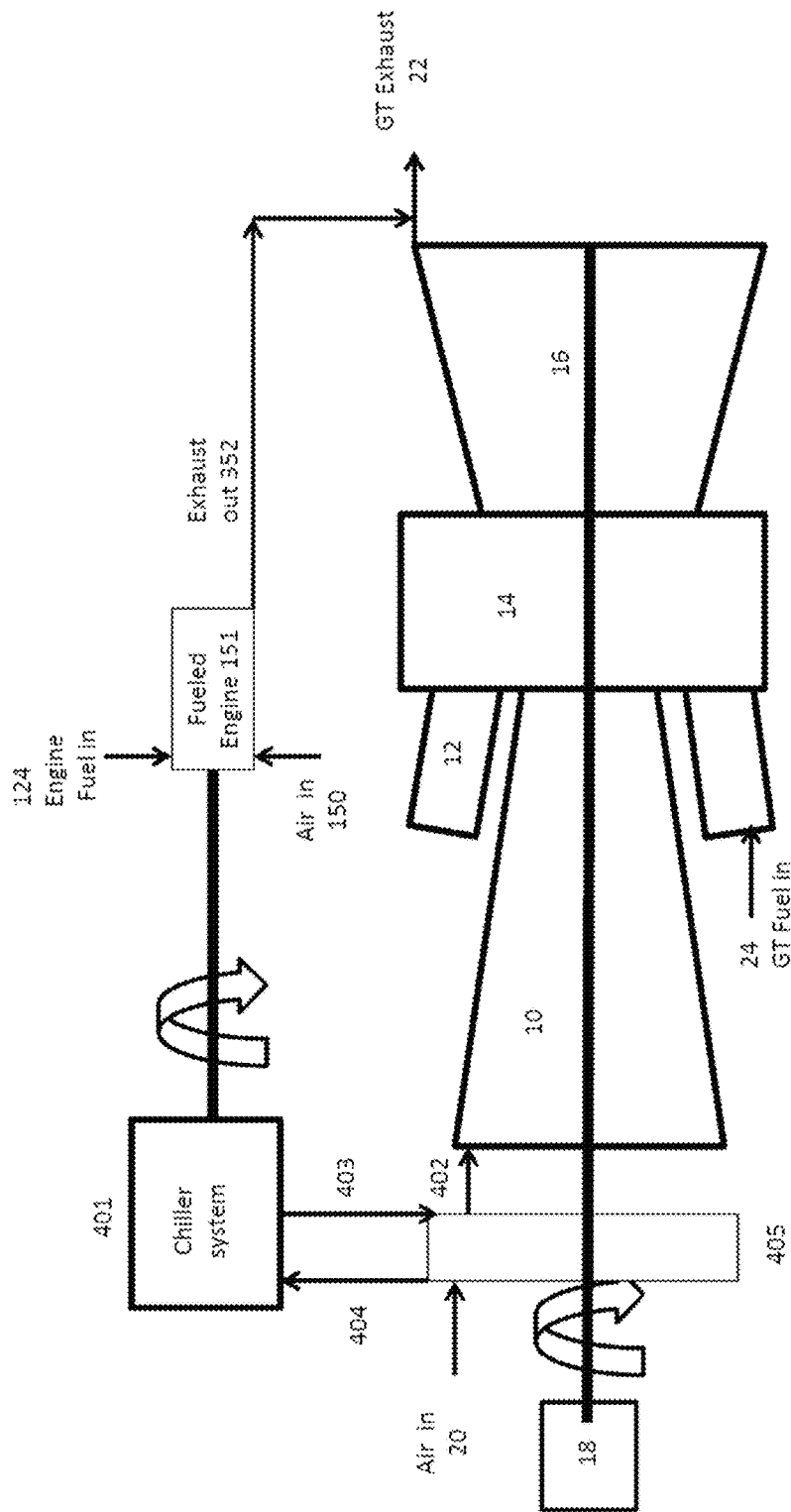
FIG. 3 is a schematic drawing of an embodiment of the present invention incorporating a supplemental power augmentation inlet chilling system using a separately fueled engine driven chiller, where the exhaust from the separately fueled engine is integrated into the GT's exhaust.

FIG. 3 utilizes an alternative technology, an inlet chilling system (401), for power augmentation. Inlet chilling works by providing a cold refrigerant that is used to cool fluid that is circulated in a radiator (405). The cooled fluid (403) enters the radiator (405) and cools the gas turbine inlet air (20) passing through the radiator (405) such that cool air (402) is discharged into the inlet of the GT causing the GT cycle to be more efficient and produce more power. The cooling fluid is then discharged (404) from the radiator (405) warmer than when it entered and the chiller system (401) cools that fluid back down. Conventionally these systems are driven by electric motors, which places a large parasitic load on the plant at the same time the plant is trying to make additional power, which translates to a significant heat rate penalty. When a separately fueled engine is used to drive the chiller, the parasitic load is eliminated. With the advent, current popularity and advancements, of efficient natural gas reciprocating engines, the exhaust from the reciprocating engine can be added to the gas turbine exhausts to make additional steam in the HRSG for the steam turbine. Some or all of this additional steam can also be extracted and used as steam injection for power augmentation if desired. Both of these features are significant efficiency improvements to a combined cycle plant. At simple cycle plants, an auxiliary boiler (not shown) can utilize the hot exhaust (352) to produce steam which can be used for steam injection into the GT resulting in power augmentation.

Figure 4:
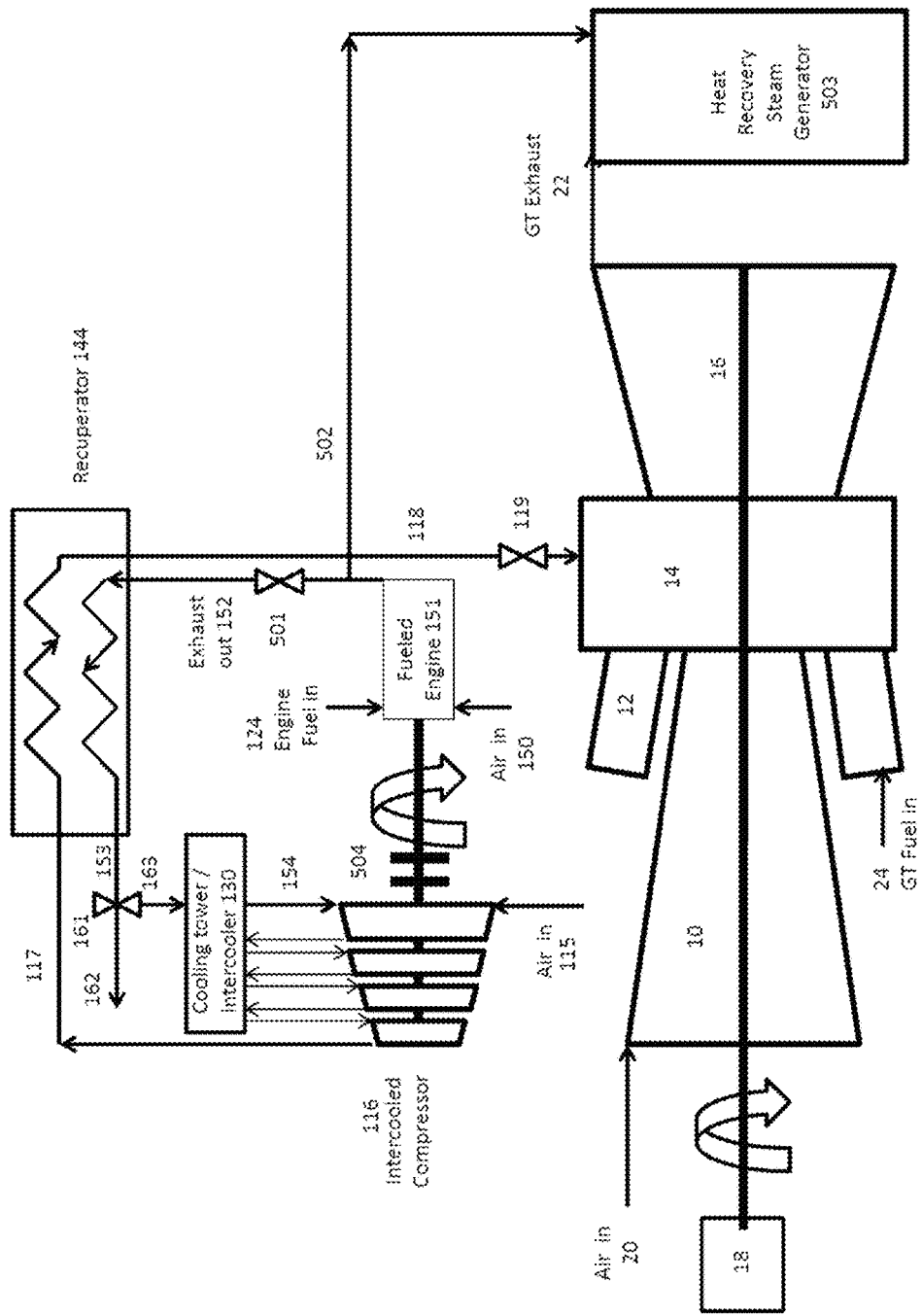
FIG. 4 is a schematic drawing of an embodiment of the present invention with a heat recovery steam generator heating system using the fueled engine exhaust, where both compressed air and the fueled engine's exhaust is used to keep the simple or combined cycle plant warm while the plant is not running.

FIG. 4 shows an alternate embodiment of FIG. 1 where a valve (501) is placed in the exhaust (152) of the separately fueled engine (151) which diverts the exhaust (502) from the engine (151) to the HRSG (503) of a combined cycle plant where it is used to preheat or keep the system warm enabling quicker start times. When this system is operated, a hydraulic or mechanical clutch (504) is used to disengage the shaft of the fueled engine (151) from the compressor (116) such that it does not operate.

Figure 5:
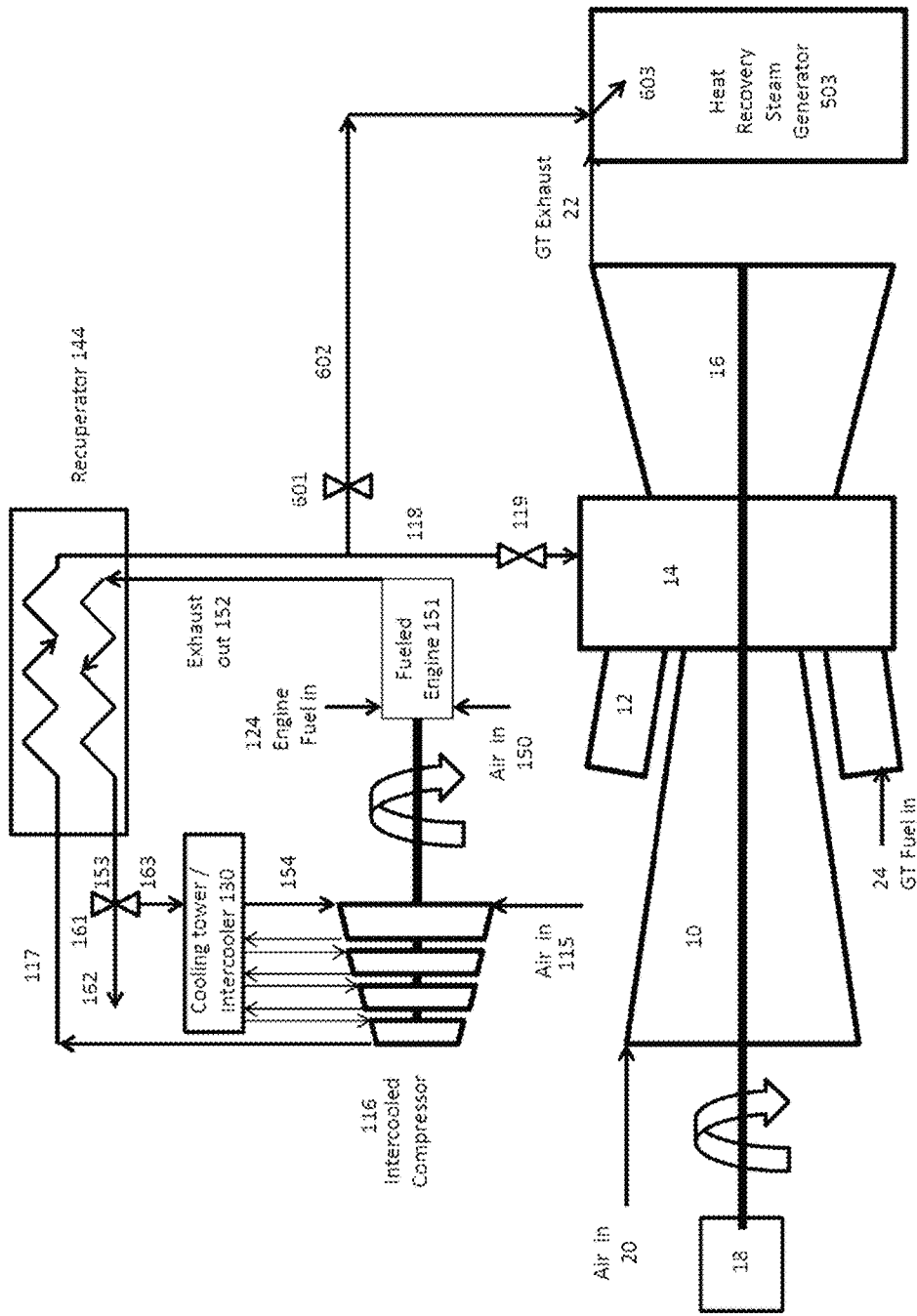
FIG. 5 is a schematic drawing of an embodiment of the present invention incorporating a fast start system using compressed air, where a mixture of compressed air and compressed exhaust from the fueled engine is used to keep the simple or combined cycle plant warm while the plant is not running.

FIG. 5 is very similar to FIG. 4, however, the clutch for the supplemental compressor (116) is eliminated and the compressor (116) provides compressed air/exhaust mixture (602) to the HRSG (503) and/or compressed air/exhaust mixture (118) to the gas turbine via recuperator (114). This may be advantageous over low pressure exhaust as shown in FIG. 4 because the pressurized air/exhaust mixture can be more easily directed to flow to areas than relatively low pressure air/exhaust mixture. Additionally, the separately fueled engine (151) will produce hotter exhaust temperatures which may be desired for heating purposes. This configuration may be altered in such a way such that low pressure, but very high temperature exhaust (not shown) may be used to preheat areas of the HRSG (503) and GT that can utilize hotter temperature air, and the lower temperature compressed air/exhaust can be used in areas of the HRSG (503) and turbine that can utilize cooler temperature air.

Figure 6:
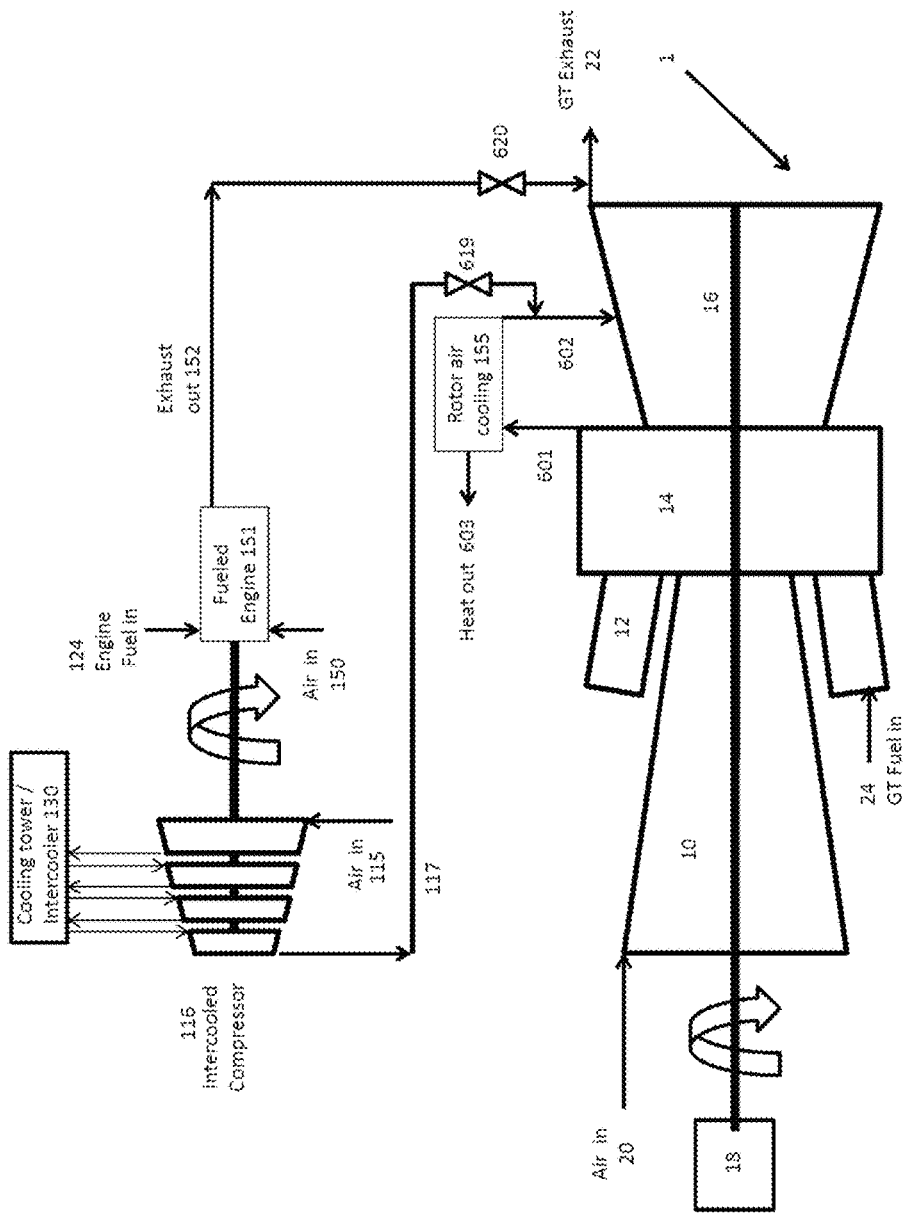
FIG. 6 is a schematic drawing of an embodiment of the present invention with turbine cool air supplement, where cool cooling air is supplied to the high pressure cooling circuit of the gas turbine by the supplemental compressor and the fueled engine and the fueled engine's exhaust is added to the gas turbine's exhaust.
Figure 7:
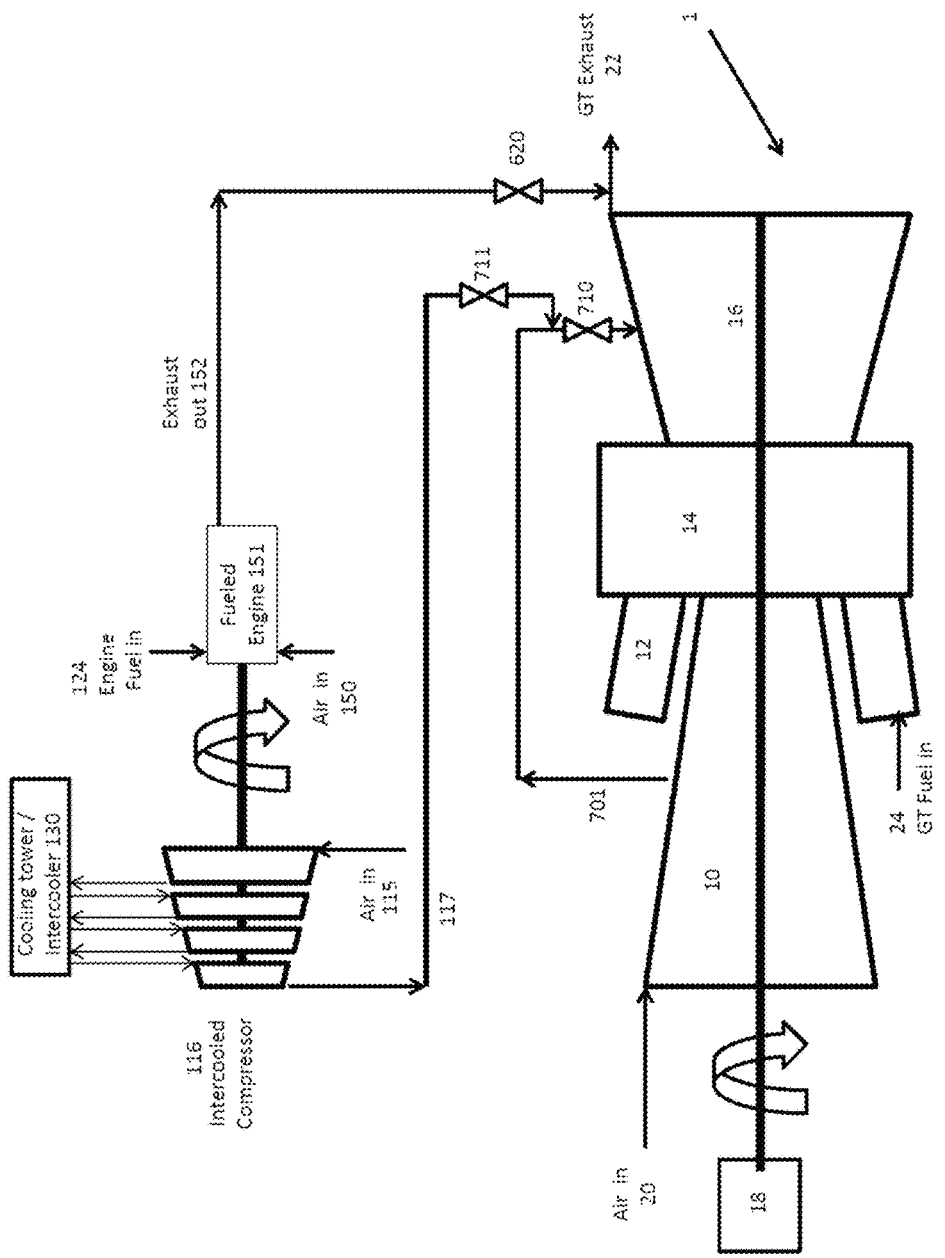
FIG. 7 is a schematic drawing of an embodiment of the present invention with downstream turbine nozzle cooled cool air supplement, where cool cooling air is supplied by the supplemental compressor and the fueled engine to the intermediate pressure cooling circuit and the fueled engine's exhaust is added to the GT's exhaust.
Figure 8:
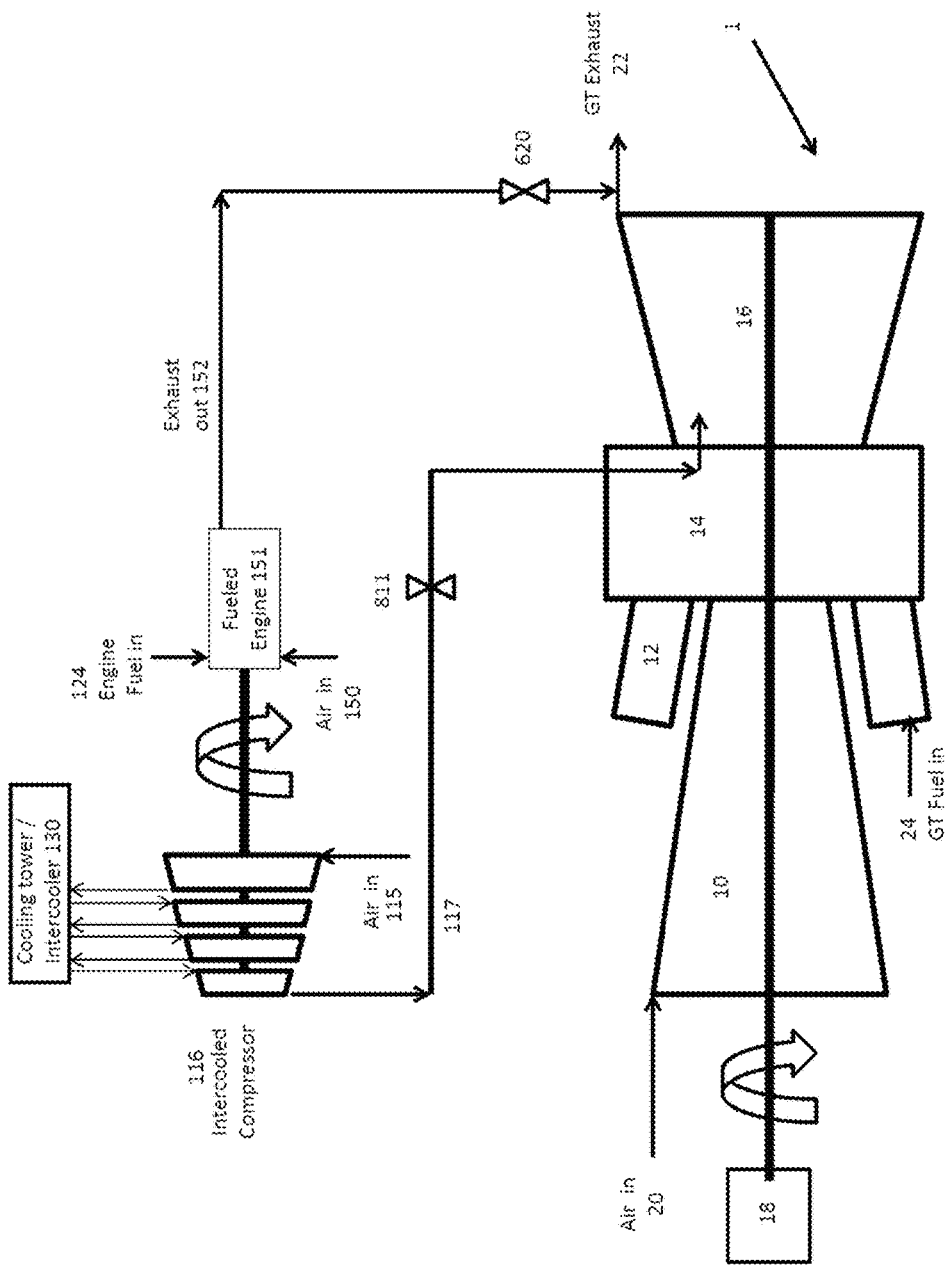
FIG. 8 is a schematic drawing of an embodiment of the present invention with first turbine nozzle cooled cooling air supplement, where cool cooling air is supplied by the supplemental compressor and the fueled engine to the first stage nozzle cooling circuit of the gas turbine and the fueled engine's exhaust is added to the GT's exhaust.
Figure 9:
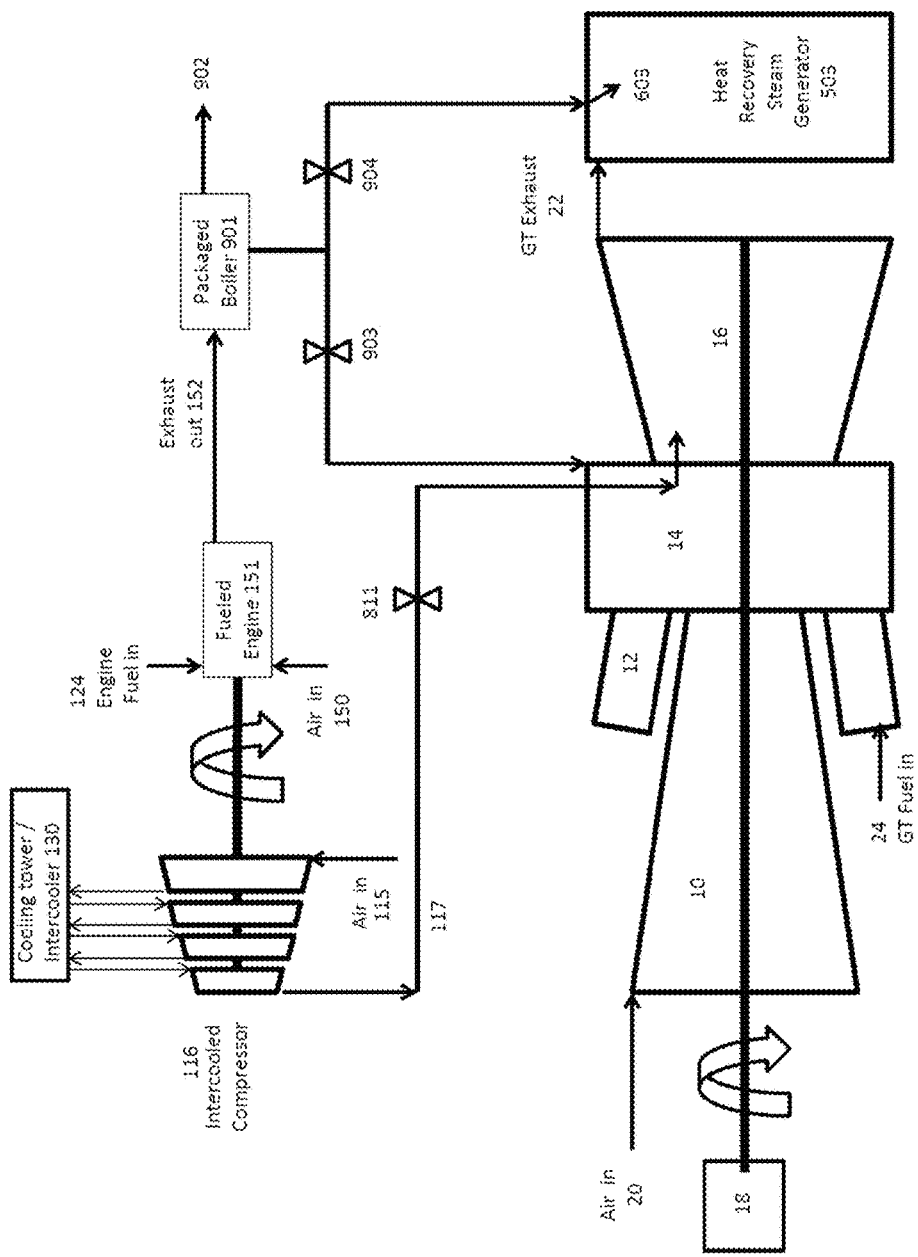
FIG. 9 is a schematic drawing of an embodiment of the present invention having fast start with air and steam injection, where cool cooling air is supplied by the supplemental compressor and the fueled engine to the first stage nozzle cooling circuit, the high pressure cooling circuit or the intermediate pressure cooling circuit of the gas turbine, and the fueled engine's exhaust is used to produce steam for power augmentation when the gas turbine is operating and the compressed air and steam is used to keep plant warm when the gas turbine is not operating.

FIG. 6 is a simplified approach to injecting compressed air into the gas turbine system (1) because the compressed air (117) is not required to be heated because the air is used to replace cooled cooling air (602) that is normally supplied by the gas turbine (601) and cooled by air or steam in the rotor air cooling system (155). Under normal operation of a Siemens Westinghouse 501F, 501D5, and 501B6 engine, for example, approximately 6.5% of the air compressed by the compressor (10) is bled (601) from the compressor discharge plenum (14) through a single large pipe, approximately 20" in diameter. The bleed air (601) is approximately 200-250 psi and 650-750 F. This hot air enters the rotor air cooling system (155) where air or steam is used to cool the bleed air (601). Heat is discharged to atmosphere (603) and wasted when air is used to cool the bleed air (601). However, if steam is used as the coolant to cool the bleed air (601), heat is transferred from the bleed air (601) to the steam, thereby increasing the enthalpy of the steam, and the steam can then be used in the steam cycle. In both cases, there is an efficiency improvement of the gas GT (1) cycle if no heat is discharged at all. By injecting the cool pressurized air (117) upstream (601) or downstream (602) of the rotor air cooler (155), the heat rejected (603) is minimized or eliminated, thus improving the GT (1) cycle efficiency while at the same time effectively increasing the mass flow of air through the combustor (12) section and turbine section (16). Most gas turbines have dedicated intermediate pressure compressor bleeds (701) that are used to cool the later stages of the turbine where reduced pressures are required as shown in FIG. 7. Also, all gas turbines feed the first vane cooling circuit with the highest pressure available, which is in the compressor discharge wrapper (14) (or combustor case) as shown in FIG. 8. Depending on the injection location, the rotor cooling air as shown in FIG. 6, the intermediate pressure cooling as shown in FIG. 7 or the first vane cooling as shown in FIG. 8, different pressures are required. These pressures can be supplied by the exit of the intercooled supplemental compressor (116) or from earlier stages of the intercooled supplemental compressor (116) for lower pressure applications. In all cases, since this type of injection utilizes little (not shown) or no recuperation to heat the air up, the exhaust (152) of the separately fueled engine can be added to the gas turbine exhaust (22) as shown to increase the exhaust energy for a combined cycle plant. If the power boost system of the present invention is located at a simple cycle plant, the hot exhaust (152) can be utilized in a packaged boiler (901) to make steam for injection into the gas turbine (903) as shown in FIG. 9. Since the Turbo-PHASE packages (as the present invention is called) are meant to be modular, it may be advantageous to incorporate the packaged boiler (901) on at least one of the units such that during off peak times the TurboPHASE modular package can be run to keep the gas turbine warm with pressurized hot air (117) circulation and keep the steam turbine/HRSG (503) warm with steam circulation to reduce the starting time requirement.

Figure 10:
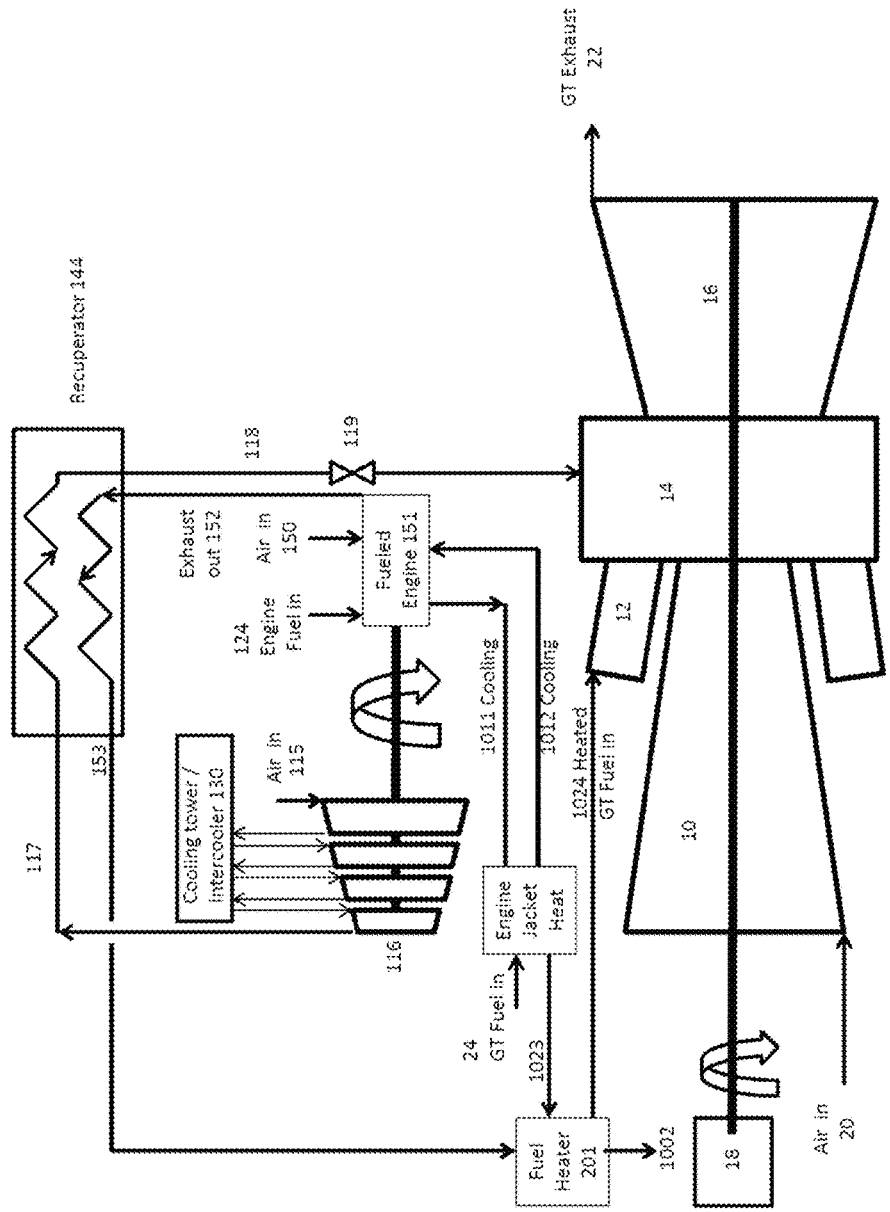
FIG. 10 is a schematic drawing of an embodiment of the present invention with fuel heating, having a supplemental energy system with a recuperated fueled engine driving the supplemental compressor, where some or all of the fueled engine's exhaust is used to heat the gas turbine's fuel.

There are further improvements in efficiency that can be achieved by incorporating the low quality heat. For example in FIG. 10, the gas turbine fuel input (24) can be preheated (1023) with heat from the fueled engine's jacket cooling system (1011 and 1012). By doing this, the plant cooling requirements will be reduced and the gas turbine fuel will be preheated (1023) prior to entering the fuel heater (201), thus requiring less heat input to achieve a desired fuel temperature, or to be able to achieve a higher fuel temperature. FIG. 10 also shows an alternate embodiment where the exhaust (153) from the recuperator (144) is used to add the final heat into the gas turbine fuel (1024) prior to injection into the GT. In this case, the exhaust gas (153) of the alternately fueled engine (151), after flowing through the fuel heater (201) and being discharged (1002) is relatively cool.

While the particular systems, components, methods, and devices described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

The invention claimed is:

1. A method of operating a gas turbine energy system comprising:
   (a) operating a gas turbine system comprising a compressor, a combustor case, a combustor, and a turbine, fluidly connected to each other;
   (b) pressurizing ambient air using a supplemental compressor driven by a fueled engine;
   (c) injecting said pressurized air into a rotor cooling air circuit upstream of a rotor air cooler; and
   (d) adding exhaust of the fueled engine to exhaust of the turbine, the fueled engine exhaust bypassing the combustor.

2. The method of claim 1, wherein said pressurized air is not heated by said fueled engine.

3. The method of claim 1, wherein injecting said pressurized air from said supplemental compressor into said rotor cooling air circuit increases mass flow through said combustor.

4. The method of claim 1, wherein injecting said pressurized air upstream of said rotor cooling air circuit, minimizes heat rejected from said rotor cooling air circuit.

5. The method of claim 1, wherein said pressurized air has a lower temperature than a compressed air in said rotor cooling air circuit.

6. A method of operating a gas turbine energy system comprising:
   (a) operating a gas turbine system comprising a compressor, a combustor case, a combustor, and a turbine, fluidly connected to each other;
   (b) pressurizing ambient air using a supplemental compressor driven by a fueled engine;
   (c) injecting said pressurized air into a rotor cooling air circuit; and
   (d) adding exhaust of the fueled engine to exhaust of the turbine, the fueled engine exhaust bypassing the combustor.

7. The method of claim 6, wherein the pressurized air is injected upstream of a rotor air cooler.

8. The method of claim 7, wherein injecting said pressurized air minimizes heat rejected from said rotor cooling air circuit.

9. The method of claim 6, wherein said pressurized air is not heated by said fueled engine.

10. The method of claim 6, wherein injecting said pressurized air from said supplemental compressor into said rotor cooling air circuit increases mass flow through said combustor.

11. The method of claim 6, wherein said pressurized air has a lower temperature than a compressed air in said rotor cooling air circuit.

* * * * *